July 1, 1947.  J. T. JANETTE  2,423,323
VARIABLE SPEED TRANSMISSION
Filed July 3, 1944  3 Sheets-Sheet 1

Inventor
John T. Janette
By Glenn S. Noble
Atty.

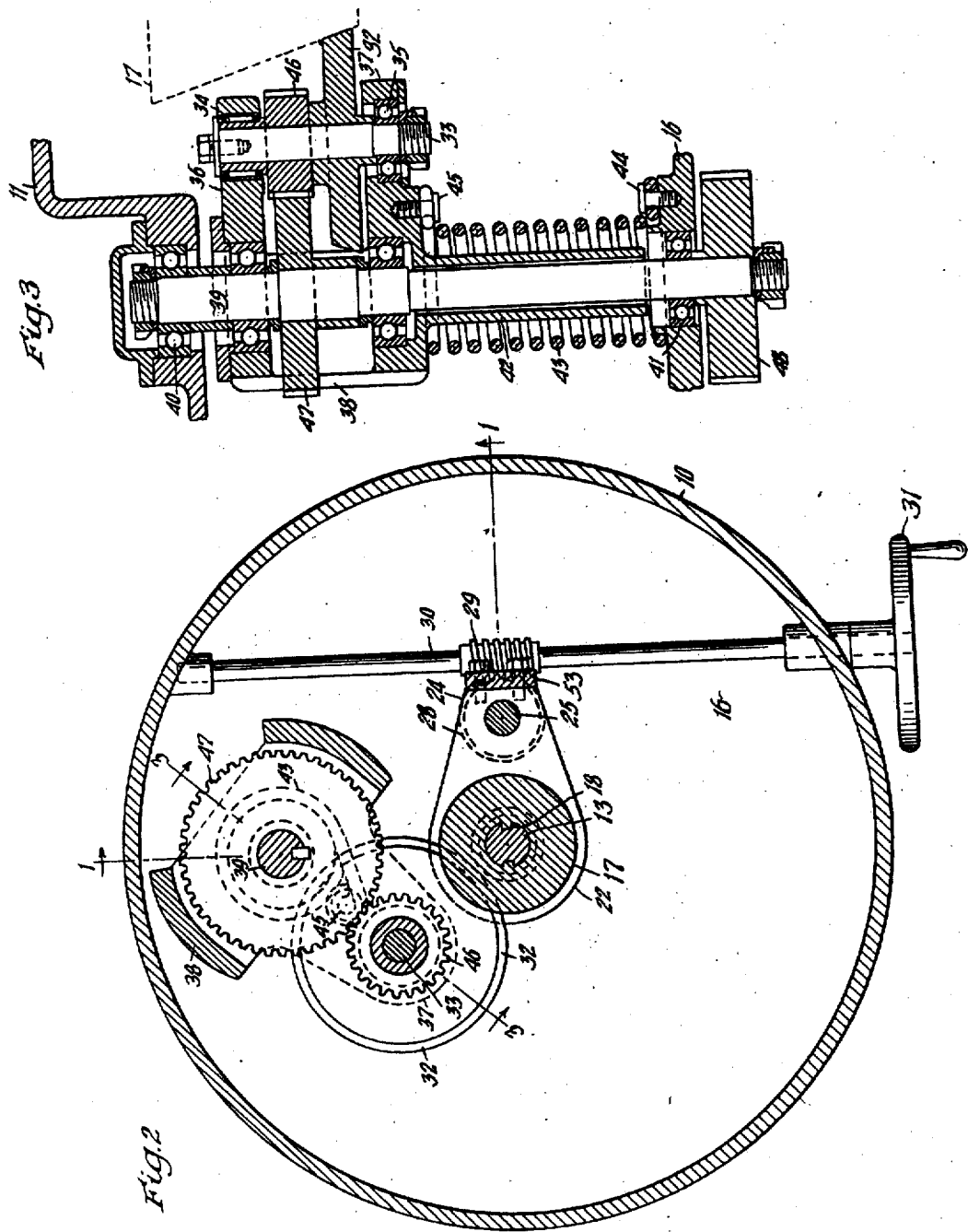

Inventor
John T. Janette
By Glenn S. Noble
Atty.

Patented July 1, 1947

2,423,323

UNITED STATES PATENT OFFICE 2,423,323

VARIABLE-SPEED TRANSMISSION

John T. Janette, Kenilworth, Ill., assignor to Janette Manufacturing Company, Chicago, Ill., a corporation of Illinois Application July 3, 1944, Serial No. 543,313

3 Claims. (Cl. 74—191)

This invention relates to novel means for transmitting power from a driving or input member or source of power to a driven or output member whereby the speed of the driven member may be varied within all necessary or desirable limits.

The objects of this invention are to provide a variable speed transmission which will have a full speed range through an infinite number of steps with means for adjusting the same to deliver different speeds of output; to provide a transmission of this character which will be of simple construction and particularly durable and efficient in operation; to provide a transmission having a high coefficient of efficiency; to provide a variable speed transmission having coacting driving parts which may be made of any suitable materials, but which are preferably made of metal and run in oil for improved operation; to provide an apparatus of this character which will have such further advantages and desirable features as will appear more fully from the following description.

In the accompanying drawings illustrating this invention,

Fig. 2 is a plan view partly in section and with parts omitted for convenience in illustration;

Fig. 3 is a sectional view taken substantially on the line 3—3 of Fig. 2;

Figure 1:
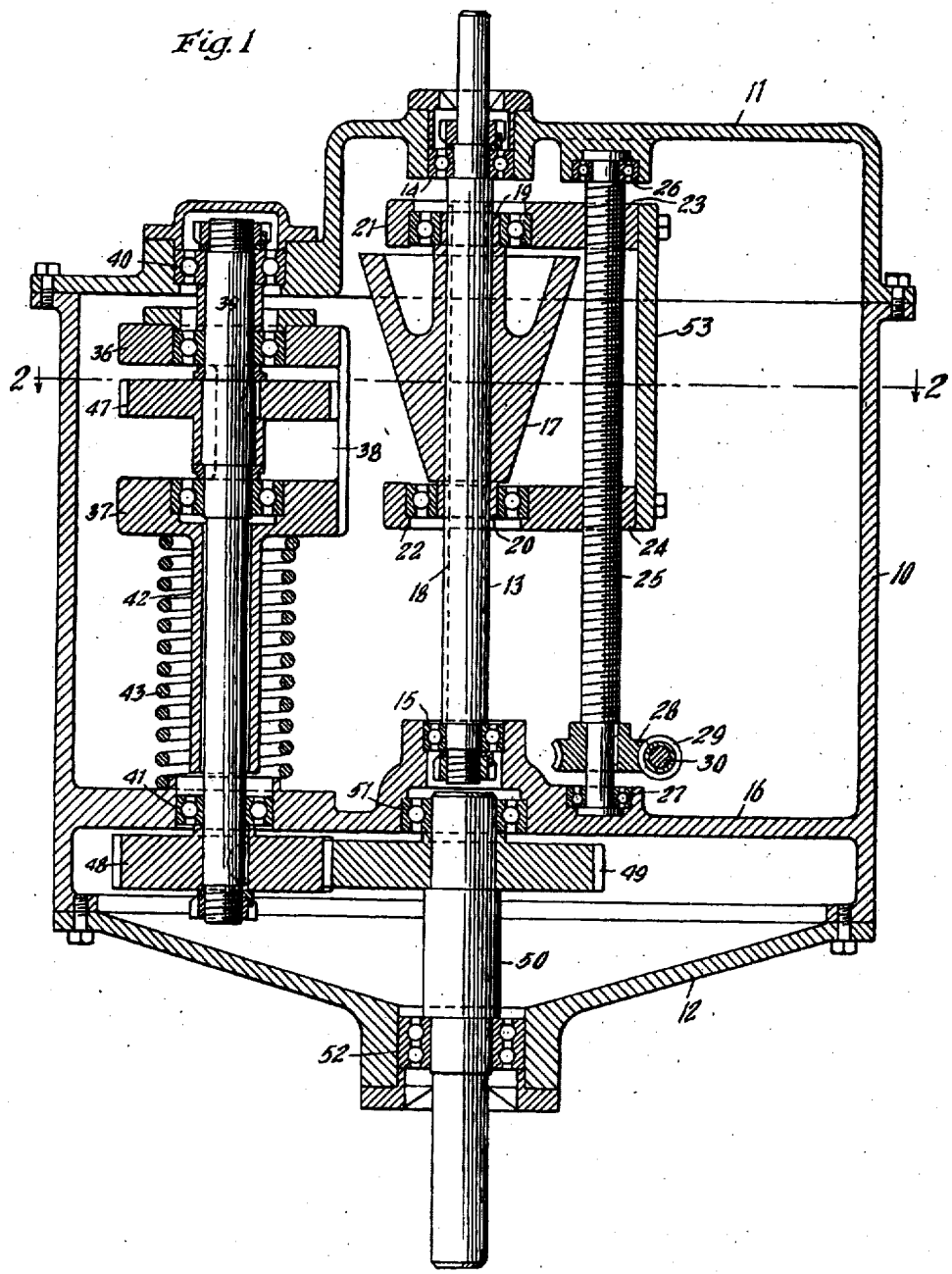
Fig. 1 is a longitudinal sectional view taken substantially on the line 1—1 of Fig. 2.

As shown in these drawings, the principal operating parts are enclosed in the case or housing 10 having detachable ends or covers 11 and 12. A driving or input shaft 13 is mounted longitudinally of the housing and is carried in a bearing 14 in the cover 11, and a second bearing 15 supported by a cross wall or web 16. Any suitable bearings may be used, but ball bearings such as shown are desirable in order to take up the end thrust. A driving cone 17 is slidably mounted on the shaft 13 and is keyed or splined to the shaft as shown at 18 whereby it will be driven thereby. This cone has trunnions or hubs 19 and 20 at either end thereof which engage respectively with bearings in adjusting discs or members 21 and 22 which members have lugs or projections 23 and 24 threaded for engagement with an adjusting screw 25, and are connected by a bar 53. One end of this screw engages with the bearing 26 in the top plate or cover 11, and the other end with a bearing 27 in the cross wall or web 16.

The screw is turned by means of a worm gear 28 which coacts with a worm 29 on a transverse shaft 30. This shaft is carried in suitable bearings in the housing and extends outwardly through the housing, being provided with a hand wheel or crank 31 for manually turning the same. By means of this adjusting arrangement, the cone 17 may be moved longitudinally of the shaft 13 for speed adjustments which will presently be described.

The cone 17 coacts with a driven element 32 in the form of a beveled disc or short truncated cone as shown. The driven cone 32 is secured to a stub shaft 33 carried in bearings 34 and 35 in the respective arms 36 and 37 of a yoke 38. This yoke is pivotally mounted on a shaft 39 which is carried in a bearing 40 in the cover 11 and a second bearing 41 in the cross wall 16. By means of this arrangement, it will be seen that the cone disc 32 is swingingly mounted with respect to the shaft 39 or may revolve with respect to the same, and the arc of revolution of the outer portion of the disc is such that it will intercept the surface of the cone 17 throughout the full range of adjustment of the cone.

The yoke has a downwardly extending tube 42 which fits freely over the shaft 39 and terminates adjacent to the bearing 41. The disc is held in operating position against the cone by means of a spring 43 which may be of any suitable form, but as shown is a coiled or helical spring with its lower end engaging with a pin 44 in the wall 16 and its upper end engaging with a pin 45 secured to the yoke 38 so that when the spring is wound up to a predetermined tension, it will hold the disc in frictional and driving engagement with the cone.

A gear 46 is secured to the shaft 33 and engages a gear 47 which is keyed to the shaft 39, these gears being of any predetermined relative dimensions in order to secure the desired speeds. Another gear 48 is keyed or otherwise secured to the lower end of the shaft 39 and meshes with a gear 49 on the driven or output shaft 50 which is mounted in a bearing 51 in the wall 16, and a second bearing 52 in the cover or end 12 and extends outwardly through such cover. This shaft may be provided with any suitable gear or driving means (not shown) for transmitting power therefrom.

When the shaft 13 is driven from any suitable source of power, the cone 17 will act as the driving member of the transmission and will turn the cone disc or driven member 32 which will cause the output shaft 50 to be driven through the train of gears and shafts above described. By properly proportioning the pairs of gears, any desirable reduction or increase of speed may be provided for the output or driven shaft 50.

When it is desired to change the speed, the hand wheel or crank member 31 is turned which causes the screw 25 to be rotated through the medium of the worm and worm gear which provides a very fine adjustment for such screw. When the screw is turned, the discs or members 21 and 22 will be moved longitudinally of the shaft 13 and will carry the cone 17 along to any desired position. As the cone moves downwardly or toward the disc 32, as shown in Fig. 1, the disc will be moved laterally or will swing with its yoke, but constant pressure against the cone will be provided by the spring 43 in order to provide suitable driving friction. This provides an efficient means for varying the speed whereby an infinite number of speeds may be obtained within the range of the apparatus.

Figure 4:
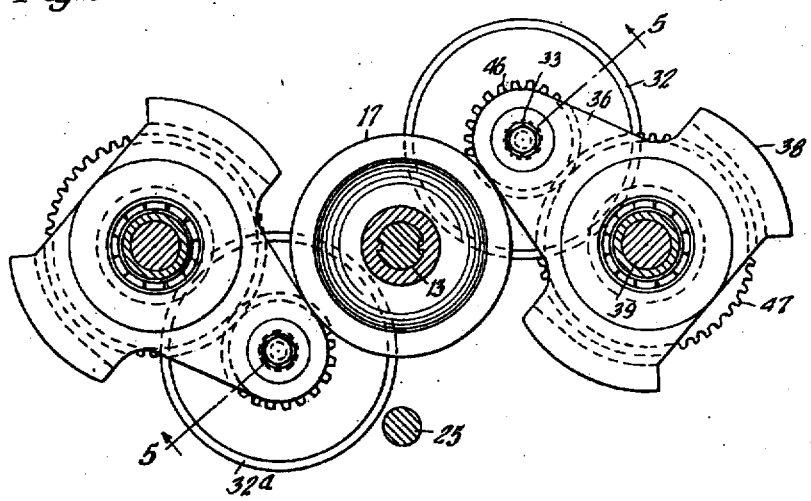
Fig. 4 is a plan view partly in section showing a modified form of construction.
Figure 5:
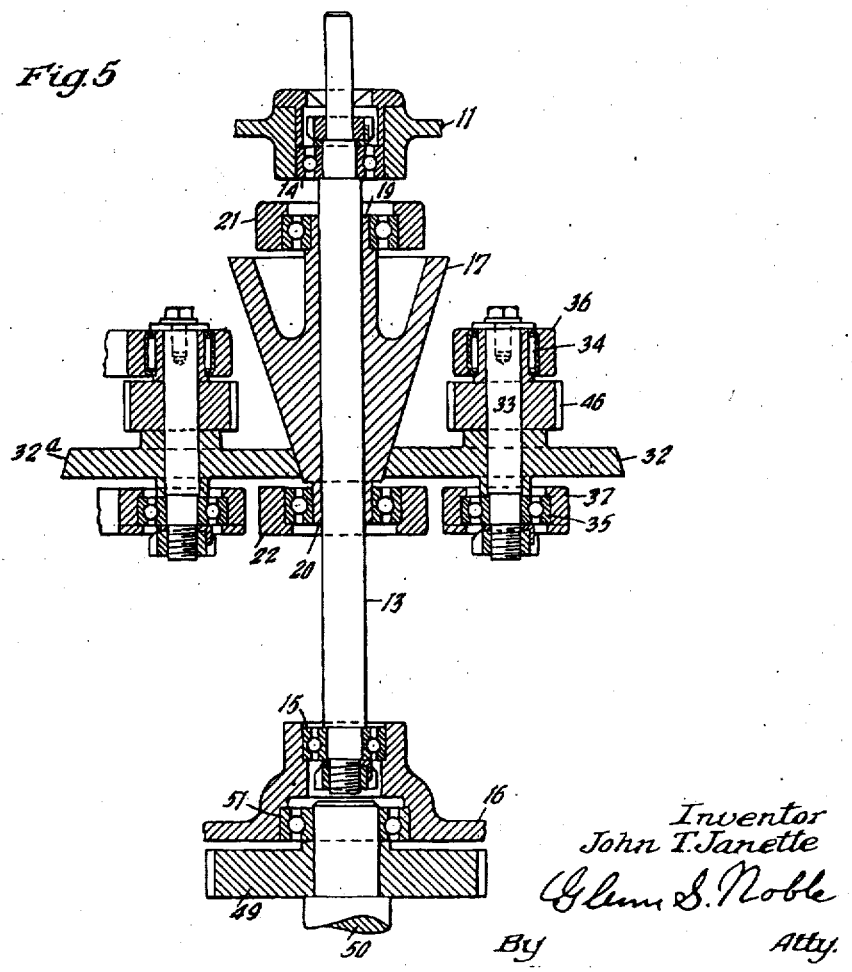
Fig. 5 is a sectional detail taken substantially on the line 5—5 of Fig. 4.

In some instances, it may be desired to provide additional driving power and also to balance the working strains which I accomplish by having a plurality of driven members or discs actuated by the driving cone. Such an arrangement is shown in Figs. 4 and 5 in which a second driven disc or cone 32a is positioned on the side of the cone 17 opposite from the disc 32. This permits a balanced driving action and tends to relieve any side thrust on the driving cone and connected parts. The disc 32a is mounted in the same manner as the disc 32 and is connected with the output shaft 50 through gears and shaft, in the same manner as the disc 32 so that further description does not appear necessary.

While I have shown a preferred form of my invention, it is apparent that changes may be made in the details of construction or arrangement of the parts in order to adapt it to different uses, or for other reasons, and therefore I do not wish to be limited to the particular construction shown and described other than as set forth in the following claims.

I claim:

1. The combination of a housing, a shaft rotatably mounted in the housing, a conical driving member splined to the shaft to permit longitudinal movement while being driven by the shaft, supports engaging with the ends of the driving member, a screw coacting with the supports for adjusting the driving member along the shaft, means for manually turning the screw, a second shaft mounted in the housing parallel to the first named shaft, a yoke pivotally mounted on the last named shaft with its arms extending towards the driving member, a stub shaft mounted in said arms, a driven disc carried by said stub shaft and having frictional engagement with the conical driving member, a gear secured to the stub shaft, a gear secured to the second named shaft and meshing with the gear on the stub shaft, and means for transmitting power from the second named shaft.

2. The combination of a support, a driving shaft rotatably mounted in said support, a driving member having a substantially conical driving surface slidably mounted on the shaft and rotatable therewith, means for adjusting said member longitudinally of the shaft, a second shaft rotatably mounted in the support, a tube around the lower portion of the last named shaft, a yoke connected with the tube and rotatable on said shaft, a driven disc carried by the yoke and engaging circumferentially with the driving member, a spring around the tube having one end fixed to the support and the other end engaging with the yoke tending to hold the driven member against the driving member, and means for transmitting power from the driven member.

3. A variable speed transmission consisting of a housing, a driving shaft mounted in said housing, a driving cone slidably mounted on the shaft and driven thereby, an adjusting screw mounted in the housing parallel to the driving shaft, means operatively connected with the screw and the cone for moving the cone longitudinally of the driving shaft, means for manually turning said screw, a driven cone adapted to coact with the driving cone and driven thereby, a driven shaft mounted in said housing parallel to the driving shaft, a yoke rotatably mounted on the driven shaft, a stub shaft carried by said yoke and having the driven cone secured thereto, a gear fixed to the stub shaft, a gear mounted on the driven shaft between the arms of the yoke and engaging with the gear on the stub shaft, a helical spring carried by the last named shaft with one end fixed to the housing and the other end fixed to the yoke and biased to urge the driven cone into engagement with the driving cone, an output shaft mounted in the housing, and means for driving the output shaft from the driven shaft.

JOHN T. JANETTE.

REFERENCES CITED

The following references are of record in the file of this patent:

UNITED STATES PATENTS

| Number | Name | Date |
| --- | --- | --- |
| 2,142,730 | Kohl | Jan. 3, 1939 |
| 2,139,560 | Olson | Dec. 6, 1938 |
| 2,297,078 | Schlichter | Sept. 29, 1942 |
| 1,973,576 | Miller | Sept. 11, 1934 |
| 1,431,649 | Gillette | Oct. 10, 1922 |